Roebling & McMurtry.

Railroad Chair.

No. 2,767. Reissued Oct. 1, 1867.

Witnesses;

W. H. Roebling
Charles Evans

Inventor;

John A. Roebling
John McMurtry

United States Patent Office.

JOHN McMURTRY, OF LEXINGTON, KENTUCKY, ASSIGNEE OF J. A. ROEBLING AND J. McMURTRY.

*Letters Patent No.* 50,776, *dated October* 31, 1865; *reissue No.* 2,767, *dated October* 1, 1867.

IMPROVED RAILROAD CHAIR.

The Schedule referred to in these Letters Patent and making part of the same.

TO ALL WHOM IT MAY CONCERN:

Be it known that we, JOHN A. ROEBLING, of Trenton, in the county of Mercer, and State of New Jersey, and JOHN McMURTRY, of Lexington, in the county of Fayette, and State of Kentucky, have invented a new and improved Railroad Chair; and we do hereby declare that the following is a full, clear, and exact description thereof, which will enable others skilled in the art to make and use the same, reference being had to the accompanying drawings, forming part of this specification, similar letters of reference therein indicating like parts.

The object of this invention is to obtain a chair for connecting the ends of railroad rails in such a manner that they will be held firmly in position, and be protected from the action of the car-wheels, and prevented from being hammered down and flattened as the wheels pass over them, and worn out before the remainder of the rails, a contingency due mainly to the working of the ends of the rails vertically under the weight of the cars, and which is attended with great expense in the way of rerolling or repairing the rails and making good the increased wear of machinery and rolling stock. In the accompanying drawings—

Figure 1:
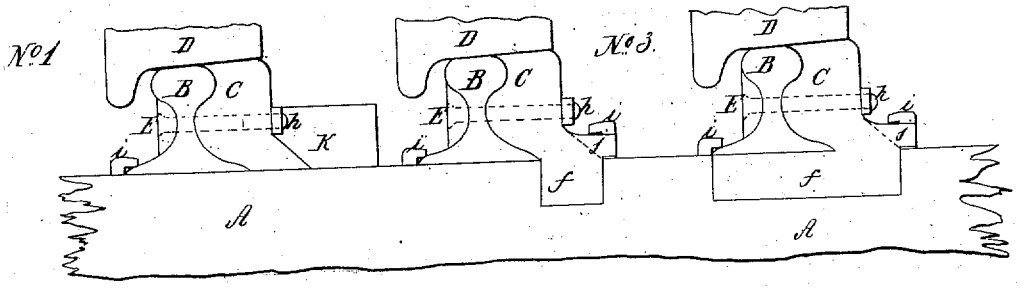

No. 1 in Figure 1 represents a transverse vertical section of the first modification of our invention, which will be first described.

A A represents a longitudinal section of a sleeper or cross-tie, and the remainder of the figure a transverse vertical section of the rail, the chair, and the lower portion of a car-wheel, B being the rail and D the car-wheel. C is a solid block of cast iron or steel, or other equivalent material. This block is made long enough to rest on two sleepers or cross-ties, and may be made of sufficient length to rest on three or more, if it is thought desirable. The side of the block which is next to the rails is cast of a curved form, corresponding with the curvature of the side of the rails, so that the two may be adjusted closely or snugly to each other. The upper surface of the block is on a level with or slightly above the upper surface of the rails, so that the car-wheels, (the rim or tread of which, in all ordinary wheels, is double the width of the head of the rails, and, in the driving-wheels of locomotives, wider still,) in passing along the rails, will cause the extra width of the wheels to roll over and bear upon the upper surface of the block C, which should be made of equal strength with the rails themselves. E represents a plate of wrought or rolled iron or steel, or other equivalent material, which is wrought or rolled so as to be of a curved form on one side, corresponding with the curvature of the side of the rails, against which it is snugly fitted on the side opposite to the block C. There are four bolts *h*, which pass transversely through the plate E, the rail B, and the block C, and bind them firmly together, the holes through the rails to admit said bolts being elongated, so as to allow for the expansion and contraction of the metal in the rails and chair resulting from changes of temperature. The rails are fastened to the cross-ties in the usual manner, by spikes *i*. And the block C is kept in position and held to the cross-ties by a bar or slab of hard wood, K, of equal length with or longer than the block against which it is fitted, and which is firmly spiked to the two cross-ties on which the block rests. The upper surface of the block C, when the same is made of cast iron, is cast with a chill to resist wear.

No. 2 in fig. 1 represents the second modification of our invention, and only differs from No. 1 in the same figure in the form of the lower part of the block C, and in the manner in which it is fastened to the sleepers or cross-ties. The block C, in this modification, has a base, *f*, which extends its whole length, and is fitted into recesses or grooves cut across the sleepers on which the block rests, the lower surface of the base *f* being the bearing surface of the block. The base *f* in this modification answers the same purpose as the flanges *g g*, shown in No. 2, Figure 3, which will be hereafter described. And the block C in this modification, as well as that shown at No. 3, fig. 1, is spiked to the sleepers or cross-ties with the ordinary railroad spikes, instead of being fastened by a slab of wood.

No. 3 in fig. 1 represents the third modification of our invention, and only differs from No. 2 in the same figure in the fact that the base *f* of the block C is cast of a width sufficient to extend under and support the rails B, which rest upon it. This base, as well as that in the second modification, is fitted into recesses or grooves cut across the sleepers, and answers the purpose of the flanges *g g*, shown in No. 2, fig. 3.

Figure 2:
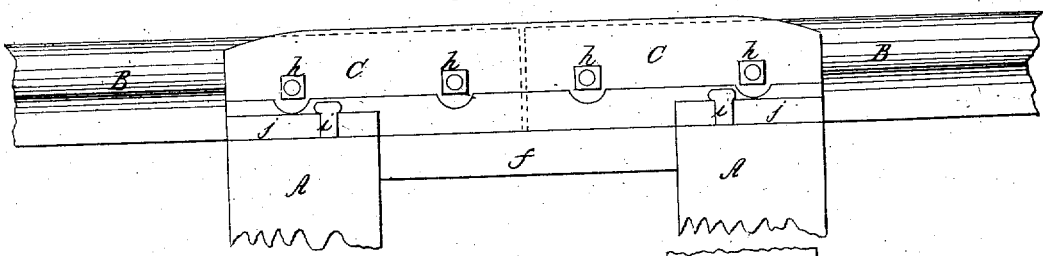

Figure 2 is a side view or elevation, from the outside of the track, of the modifications shown at No. 2 and No. 3 in fig. 1.

A A are transverse sections of the two sleepers or cross-ties on which the chair rests; B B are the rails; C C is the cast-iron block, indicated by the same letter in fig. 1; *f* is the base, fitted into recesses or grooves cut across the sleepers; *h h* are the bolts; and *i i* the spikes. There are projections *j j* over the sleepers at each end of the outside of the block C C, which are notched to receive the spikes, and thereby hold the block more securely in its position. The joint formed by the rails B B is at or near the middle of the block C C, as shown by the vertical broken lines in the figure. The upper surface of the block should be sufficiently high, when compared with the upper surface of the rails, to receive the full weight of the cars when passing over it, but not so high as to produce a jar when the wheels pass on to the block. The difference shown in the figure between the height of the upper surface of the block C C and of the rails B B is owing to the fact that the height of the block is graduated to the bevel of the rim of the car-wheels, the tread of which, at their outer edge, is higher than next the flange, as shown in fig. 1. To guard against the jar which would take place if the block C C should be slightly too high, when compared with the rails, there is a curved depression at each end of the upper surface of the block, as shown in the drawing, but no great inequality of height between the block and the rails would be allowable. It will thus be seen that, in our improvement, when the car-wheels pass over the ends or joints of the rails, the weight of the cars will be supported by the block C C, the wheels rolling over and bearing upon the upper surface of said block, and that the ends of the rails will thereby be protected from being hammered and worn out by the car-wheels.

The only change required in fig. 2, to make it correctly represent the side view or elevation of the modification shown at No. 1 in fig. 1, would be to omit the base *f*, the projections *j j*, and the spikes *i i*, and to indicate on the drawing the slab of wood K.

In casting the block C C it may be found in practice that to core it on the outer or inner surface, or both, between the bolt-holes, will make a better casting, without diminishing its strength, and the weight of metal in the block will thereby be reduced.

Figure 3:
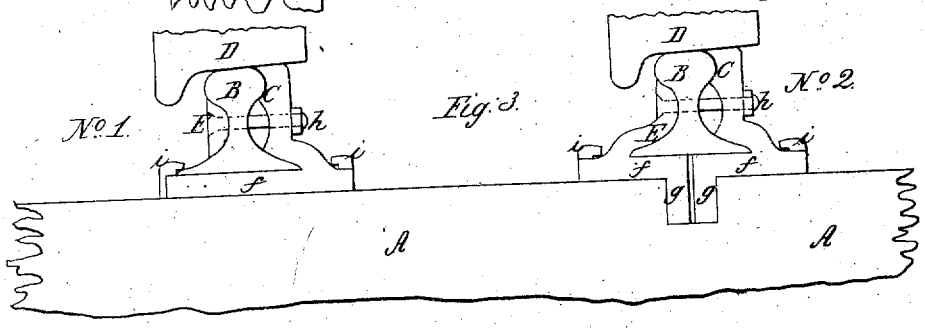

No. 1 and No. 2, in fig. 3, represent the fourth and fifth modifications of our invention. They differ from the three former modifications mainly in the fact that C C, instead of being cast-iron blocks, represent, in fig. 3, plates made of rolled or wrought iron or steel, or other equivalent material, of equal strength with the rail, and long enough to rest on two or more sleepers or cross-ties, the upper surface of said plates being on a level with or slightly above the upper surface of the rails, so that the extra width of the car-wheels will roll over and bear upon said plates as the wheels pass along the rails. The side of the plate C next the rails is rolled with curved surfaces, to fit the head and base of the rails, but a hollow space is left opposite the central or most depressed part of the rails, to fill which would only add to the weight of the plate without materially increasing its strength.

The plate C, in No. 1, fig. 3, is rolled with a base, *f*, of equal length with the plate, and of a width sufficient to extend under and support the rails B. In the same modification there is also a plate, E, of wrought or rolled iron or steel, or other equivalent material, which is rolled with a curved surface, to fit the side of the rails opposite the plate C. The two plates and the rails are firmly bolted together by four bolts *h*, as in the modifications previously described. And the plate C is spiked to the sleepers or cross-ties by the spikes *i i*.

The plate C, in No. 2, fig. 3, is rolled with a base, *f*, of equal length with the plate, but only wide enough to extend under one-half of the bottom of the rails B. The plate E in this modification is made of wrought or rolled iron or steel, or other equivalent material, and is rolled with a curved surface, corresponding with the curvature of the side of the rails, and is adjusted snugly thereto on the side opposite the plate C. The plate E is also rolled with a base, *f*, of equal length with the plate, and of sufficient width to extend under one-half of the bottom of the rails. On the inner edges of the base *f f* of each of these two plates there are vertical or pendent flanges *g g*, which together fit into recesses or grooves cut across the sleepers on which the plates rest. When the plates C and E are in their proper position, with the rails between them, the flanges *g g* will abut closely against the opposite sides of the recesses or grooves in the sleepers; but there is space enough left between the flanges themselves to allow of the plates being placed in position or removed without inconvenience from the flanges fitting too tightly in the grooves. The plates and rails are bolted together, and the plates spiked to the cross-ties, in this modification, as in those previously described.

The flanges *g g* of the plates C and E effectually prevent any lateral movement of the chair. And it will be observed that, from that fact, and by reason of the car-wheels rolling upon the upper surface of the plate C, and from the general construction and strength of the chair, nearly all the strain caused by the passage of trains is withdrawn from the bolts *h*, while in what are known as fish-bar joints the entire strain comes upon the bolts, thereby loosening them and rendering the joints inefficient.

Figure 4:
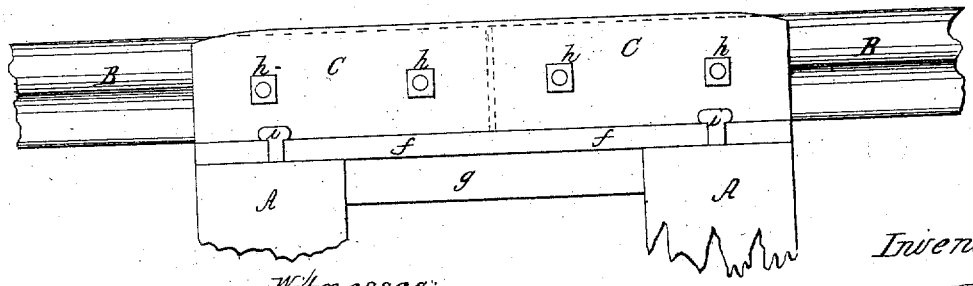

Figure 4 represents a side view or elevation, from the outside of the track, of the modification shown in No. 2 of fig. 3, like parts being indicated by similar letters of reference; and by omitting the flange *g* from the drawing it will represent a like elevation of the modification shown in No. 1 of fig. 3. The upper surface of the plate C C has a curved depression at each end, similar to, though not so great as, that of the block C C in fig. 2. The depressions of the latter are made in the casting, while those of the former may be made by applying the plate, for a few minutes, to the grindstone. The elevations in figs. 2 and 4 so far resemble each other as to render any further explanation of the latter unnecessary. But there is one valuable feature of our improvement which deserves to be mentioned, namely, that it may be applied to rails the ends of which are already partially worn, which will obviate the necessity of rerolling or mending them.

We claim as new, and desire to secure by Letters Patent—

1. A solid block of cast iron or steel, of sufficient length to rest on two or more sleepers, and constructed as described, in combination with a plate of iron or steel, of like length, fitted on the opposite side of the rails, and secured to said block and rails in the manner and for the purpose specified.

2. We claim, further, a plate of iron or steel, of such length that it will rest on two or more sleepers, in combination with a like plate fitted on the opposite side of the rails, both being constructed and connected as and for the purpose set forth.

3. We also claim the vertical flanges, pendent from the inner edge of the bases of the two plates, in combination with said plates, substantially as and for the purpose described.

JOHN A. ROEBLING,
JOHN McMURTRY.

Witnesses for J. A. ROEBLING:
J. W. ROEBLING,
CHARLES SWAN.
Witnesses for JOHN McMURTRY:
WM. MACBRAIR,
G. W. ZEBOLD.